3,278,527
BECKMANN REARRANGEMENT PROCESS

Shozo Yura and Kazuo Horiguchi, Sakyo-ku, Kyoto-shi, Japan, assignors to Honshu Kagaku Kogyo Kabushiki Kaisha, Tokyo, Japan, a corporation of Japan
No Drawing. Filed Nov. 19, 1963, Ser. No. 324,848
Claims priority, application Japan, Jan. 18, 1963, 38/2,166
2 Claims. (Cl. 260—239.3)

This invention relates to a process for the Beckmann rearrangement of cyclohexanone oxime to produce ε-caprolactam by using concentrated or fuming sulfuric acid or using an aromatic sulfonic acid as the catalyst, which is characterized in that the rearrangement reaction is carried out under reduced pressure thereby remarkably decreasing the requisite amount of sulfuric or sulfonic acid while increasing the conventional yield of the rearrangement reaction.

According to the previous method for producing ε-caprolactam (hereinafter referred to simply as "lactam") from cyclohexanone oxime (hereinafter referred to simply as "oxime") by the Beckmann rearrangement, it is necessary to use about 2 to 2.25 parts by weight of fuming sulfuric acid as catalyst per part of oxime. This is because of the fact that the water contained in the oxime must be converted at least into the monohydrate by the excessive $SO_3$ which should be present in a sufficient amount in the sulfuric acid. In case that oxime is charged as hydrochloride, it is also required to use from 1.8 to 2.0 parts by weight of sulfuric acid containing a few percent of sulfuric anhydride per part of oxime.

The process of this invention is carried out by employing 1.0–1.5 mol, preferably 1.2–1.3 mol, of concentrated sulfuric acid or monohydrate (100% sulfuric acid) per mol of oxime (which may contain some amount of water) and, at a temperature kept at 80–90° C. under a vacuum from 2 to 10 mm. Hg, slowly adding thereto a oxime under agitation while not causing the reduction in the vacuum. During the addition, the temperature is allowed to raise up to 120–125° C. slowly from 85–90° C. with adequate cooling and is kept at 120–125° C. for an additional 30 minutes until the completion of the rearrangement reaction. As stated before, vacuum must be maintained at less than 10 mm. Hg, during the reaction.

Thereafter, the sulfuric acid is neutralized and the free lactam is separated as an oil layer or extracted by solvent as usual, then vacuum distilled to give a good yield of purified lactam.

When aromatic sulfonic acid is used in place of the sulfuric acid for the Beckmann rearrangement, it must be used in 1.5–2.2 mols per mol of oxime which is added to the sulfonic acid heated at 120° C. under a vacuum of 2–10 mm. Hg and then at 140–150° C. for 30 minutes while maintaining the vacuum at 2–10 mm. Hg until completion of the rearrangement reaction.

In case the hydrochloride of oxime is employed in place of free oxime, it is slowly added to the sulfuric or aromatic sulfonic acid at 120° C.–1250° C. with agitation and without reducing the pressure. The hydrochloric acid gas evolved at this time is collected by a suitable method and the pressure of the reaction vessel is gradually reduced to a vacuum of 2–10 mm. Hg after the evolution of the hydrogen chloride gas has ceased. The temperature during the reaction is kept at 120–125° C. and the rearrangement reaction is carried out under heating and stirring in the same way as that when free oxime is used. Lactam is obtained at a good yield by the further treatment of reaction product as usual.

If fuming sulfuric acid is employed instead of sulfuric acid, the treatment may be carried out in the same way as that when hydrochloride of oxime is used, and a good yield is obtained. In this case, the total mols of both sulfuric acid and sulfuric anhydride may be at most 1.0–1.2 times that of the oxime.

The embodiment of this invention will be more clearly explained by the following examples.

Example 1

To 50 g. of monohydrate maintained under 10 mm. Hg at 80° C. with stirring, 62 g. of melted oxime (92.9% in purity, 57.6 g. in net weight) was added portionwise. The temperature of the reaction mixture was initially kept at 86° C. with cooling suitably and it was gradually elevated to 125° C. at the end of the addition. The reaction mixture was continuously stirred for 30 minutes at 120°—125° C. maintaining a vacuum of 2—10 mm. Hg to complete the reaction.

Thereafter the resulting mixture is slowly poured into 110 cc. of chilled water kept at a temperature of about 30° C., then neutralized with ammonia gas, separated into two layers and the upper layer is distilled by the usual method to give 52.9 g. of lactam. It is combined with lactam recovered by the extraction with chloroform from the lower ammonium sulfate solution layer to give a yield of 93.7%.

Example 2

To 61.5 g. of 6% fuming sulfuric acid at room temperature, 64.6 g. of melted oxime (92.98% in purity, 60 g. in net weight) was added with agitation. The temperature of the reaction mixture was controlled to be 30° C. at the beginning and to be 120° C. at the end of the addition by adequate cooling. Then the pressure was reduced to 2–10 mm. Hg and the mixture stirred for another 30 minutes at 120–125° C.

By treating thereafter the same as in the method described in Example 1, 56.4 g. of lactam (94.0% in yield) was obtained.

Example 3

82.5 g. of sulfonated benzene (84.19% of benzene sulfonate, 14.56% of sulfuric acid and 1% of water) is heated to 120° C. with stirring under a vacuum of 2 mm. Hg. 30 g. of melted dry oxime (96.58% in purity) was added thereto portionwise over an hour and the temperature was raised gradually to 140–150° C. under the same vacuum. After stirring for another 30 minutes to complete the reaction, the mixture was poured into 20% aqueous soda carbonate solution at below 40° C. to neutralize. The neutralized liquid was extracted with chloroform and the oily extract was then freed from the solvent by distillation followed by vacuum distillation to give 26.9 g. of lactam at 92.8% yield. The aqueous layer of the extraction was concentrated until the content of sodium sulfonate became 50%. After the crystallized sodium sulfate was separated by filtration, 158 g. of 50% solution of sodium benzene sulfonate was obtained.

Example 4

100 g. of oxime hydrochloride was added to 52 g. of monohydrate (1 mol per mol of oxime) at 80° C. with stirring and cooling at the beginning, and the temperature of the mixture was allowed to rise slowly to 120–125° C. at the end of the addition. After completing the evolution of hydrogen chloride gas, the pressure of the reaction vessel was reduced to 2–10 mm. Hg and kept stirring for another 30 minutes to complete the reaction.

By treating the reaction mixture the same as in Example 1, 54.5 g. of lactam was obtained. (Yield 90.8%.)

Example 5

To 90 g. of the sulfonated liquid the same as that of Example 3 heated at 120–125° C., 50 g. of oxime hydrochloride was added portionwise with stirring. After the substantial completion of hydrogen chloride gas evolution, the system was reduced to 2–10 mm. Hg vacuum and the temperature of it was gradually elevated to 140–150° C. and kept for an hour with stirring. After the same treatment as in Example 3, 27 g. of lactam was obtained. (Yield 92%.)

We claim:

1. A process for the production of E-caprolactam which comprises carrying out the Beckmann rearrangement reaction of cyclohexanone oxime using an aromatic sulfonic acid catalyst under reduced pressure.

2. A method according to claim 1 wherein the pressure is maintained at approximately 2–10 mm. Hg.

References Cited by the Examiner
UNITED STATES PATENTS 2,883,377   4/1959   Von Schick et al. ___ 260—239.3
3,167,542   1/1965   Rapp _____ 260—239.3

WALTER A. MODANCE, *Primary Examiner.*
ROBERT T. BOND, *Assistant Examiner.*